United States Patent
Perez et al.

(10) Patent No.: US 11,724,633 B2
(45) Date of Patent: Aug. 15, 2023

(54) PACKAGE SORTING SYSTEMS AND METHODS OF USE

(71) Applicant: Ford Global Technologies, LLC, Dearborn, MI (US)

(72) Inventors: Marcos Perez, Atizapan de Zaragoza (MX); David Mondragon, Tepotzotlan (MX); Juan Pablo Jimenez, Coyoacan (MX); Marco A Martinez victoria, Cuautitlan Izcal (MX); Rodrigo Vicencio, Cuautitlan izcalli (MX); Jose Adan Cortina, Mexico City (MX)

(73) Assignee: Ford Global Technologies, LLC, Dearborn, MI (US)

(*) Notice: Subject to any disclaimer, the term of this patent is extended or adjusted under 35 U.S.C. 154(b) by 39 days.

(21) Appl. No.: 17/323,820

(22) Filed: May 18, 2021

(65) Prior Publication Data

US 2022/0371499 A1 Nov. 24, 2022

(51) Int. Cl.
  *B60P 3/00* (2006.01)
  *B60P 1/52* (2006.01)
  *B60P 1/64* (2006.01)
  *B65G 1/133* (2006.01)
  *G06Q 50/28* (2012.01)
  *G06Q 10/08* (2023.01)

(52) U.S. Cl.
  CPC .............. *B60P 3/007* (2013.01); *B60P 1/52* (2013.01); *B60P 1/649* (2013.01); *B60P 1/6427* (2013.01); *B60P 1/6436* (2013.01); *B60P 1/6481* (2013.01); *B65G 1/133* (2013.01); *G06Q 10/08* (2013.01); *G06Q 50/28* (2013.01)

(58) Field of Classification Search
  CPC ......... B60P 1/52; B60P 1/6427; B60P 1/6436; B60P 1/6481; B60P 1/649; B60P 3/007; B65G 1/133
  USPC ........................................................ 414/679
  See application file for complete search history.

(56) References Cited

U.S. PATENT DOCUMENTS

| | | | |
|---|---|---|---|
| 3,749,268 A * | 7/1973 | Macomber | B60P 1/64 414/679 |
| 9,630,545 B1 * | 4/2017 | Corrigan | B60P 1/44 |
| 10,216,188 B2 | 2/2019 | Brady et al. | |
| 10,351,347 B2 | 7/2019 | Luckay et al. | |
| 10,657,485 B2 | 5/2020 | Burch, V et al. | |

(Continued)

FOREIGN PATENT DOCUMENTS

| | | | | |
|---|---|---|---|---|
| DE | 102016010681 A1 * | 3/2018 | | B60P 3/007 |
| DE | 102018009223 A1 * | 4/2019 | | B60P 3/007 |

(Continued)

OTHER PUBLICATIONS

Office of Inspector General United States Postal Service "Autonomous Mobile Robots and the Postal Service" (Apr. 2018).

*Primary Examiner* — James Keenan
(74) *Attorney, Agent, or Firm* — Brandon Hicks; Eversheds Sutherland (US) LLP (57) ABSTRACT

Package sorting systems and methods of use are disclosed herein. An example system includes a platform of a vehicle, where the platform is arranged as a grid having a plurality of slots (including an open slot and a target slot). A plurality of slabs can be placed into the grid except for in the open slot. A slab moving assembly is used to move the slabs in order to place a selected slab into the target slot on the platform.

15 Claims, 8 Drawing Sheets

(56) References Cited

U.S. PATENT DOCUMENTS

| | | | |
|---|---|---|---|
| 10,990,910 B2* | 4/2021 | Bischoff | B60P 3/007 |
| 11,237,569 B2* | 2/2022 | Kuo | B60P 1/00 |
| 2017/0291766 A1* | 10/2017 | Orth | B60P 3/007 |
| 2021/0387808 A1* | 12/2021 | Kalouche | B65G 1/1376 |
| 2022/0097970 A1* | 3/2022 | Kiyokami | B60P 3/007 |
| 2022/0119210 A1* | 4/2022 | Felton | B65G 1/0435 |
| 2022/0129833 A1* | 4/2022 | Gil | B65G 1/133 |
| 2022/0250527 A1* | 8/2022 | Lundeen | B60P 3/007 |
| 2022/0297939 A1* | 9/2022 | Chen | B60P 3/007 |

FOREIGN PATENT DOCUMENTS

| | | | | |
|---|---|---|---|---|
| DE | 102018214179 A1 | | 2/2020 | |
| JP | 55123814 A | * | 9/1980 | |
| KR | 101721233 B1 | * | 3/2017 | B60P 3/007 |

* cited by examiner

|    | C0   | C1   | C2   | C3   | C4   | C5   |
|----|------|------|------|------|------|------|
| R3 | \|19\| | \|20\| | \|21\| | \|22\| | \|23\| | \|00\| |
| R2 | \|13\| | \|14\| | \|15\| | \|16\| | \|17\| | \|18\| |
| R1 | \|07\| | \|08\| | \|09\| | \|10\| | \|11\| | \|12\| |
| R0 | \|01\| | \|02\| | \|03\| | \|04\| | \|05\| | \|06\| |

```
Moving slab 23 on R3 C4 to the right
Moving slab 22 on R3 C3 to the right
Moving slab 16 on R2 C3 up
Moving slab 10 on R1 C3 up
Moving slab 4 on R0 C3 up
Moving slab 5 on R0 C4 to the left
Moving slab 6 on R0 C5 to the left
Moving slab 12 on R1 C5 down
Moving slab 18 on R2 C5 down
Moving slab 17 on R2 C4 to the right
Moving slab 10 on R2 C3 to the right
Moving slab 4 on R1 C3 up
Moving slab 5 on R0 C3 up
Moving slab 6 on R0 C4 to the left
Moving slab 12 on R0 C5 to the left
Moving slab 18 on R1 C5 down
Moving slab 17 on R2 C5 down
Moving slab 10 on R2 C4 to the right
Moving slab 4 on R2 C3 to the right
Moving slab 5 on R1 C3 up
Moving slab 6 on R0 C3 up
Moving slab 12 on R0 C4 to the left
Moving slab 18 on R0 C5 to the left
Moving slab 17 on R1 C5 down
Moving slab 10 on R2 C5 down
Moving slab 4 on R2 C4 to the right
Moving slab 5 on R2 C3 to the right
Moving slab 6 on R1 C3 up
Moving slab 12 on R0 C3 up
Moving slab 18 on R0 C4 to the left Move completed!!
```

PACKAGE SORTING SYSTEMS AND METHODS OF USE

BACKGROUND

The need for package delivery is increasing rapidly due to the proliferation of the online marketplace. While some aspects of logistics have been optimized, the last mile of delivery can be problematic. For example, the driver of a delivery vehicle may be required to locate a package to be delivered from many packages located in a cargo area. Indeed, the cargo area may be filled with hundreds of packages. More so, while packages may be arranged, the packages may move when jostling of the vehicle occurs.

BRIEF DESCRIPTION OF THE DRAWINGS

The detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed to systems and methods to automatically arrange packages in a deliver vehicle. The system includes electronic control unit (ECU) software to sort the packages in the vehicle for optimum availability at the specified delivery vehicle door (e.g., target location). Initial package loading may be cross-referenced in the system, linking a package bar code (identifying a delivery address) with the respective platform slab (e.g., square base) where it is initially placed. The database links the package and position on the platform (and/or system layer when a plurality of platforms are installed in the vehicle). In some instances, the ECU can determine the next address on a delivery, route and identify where the package is on the platform. The ECU can determine a repositioning schema for rearranging the slabs/bases to move of the package to the selected door or other similar target location.

An example platform includes slabs placed into a grid or array. These slabs may be self-guided through connected side ribs and supported with rolling members allowing the slabs to translate over a flat surface. Each slab may include retention ribs/flanges to prevent packages from exiting the plate. The slabs may be magnetically or mechanically linked and actioned by a robotic head (e.g., carrier head) that moves along a first axis defined by a cross member and is mounted on two lateral frame rails. That is, the carrier head may be used for the translation of packages using the cross-member. The cross-member can translate along a second axis that is perpendicular to the first axis. For example, the cross-member can be mounted to frame rails include a chain/band-based mechanism to translate the cross-member. Any suitable mechanism or combination of mechanisms may be used herein, including, but not limited to, an endless/worm screw mechanisms, a rack & pinion mechanisms, the chain/band-based mechanism, or a combination thereof.

ILLUSTRATIVE EMBODIMENTS

Figure 1:
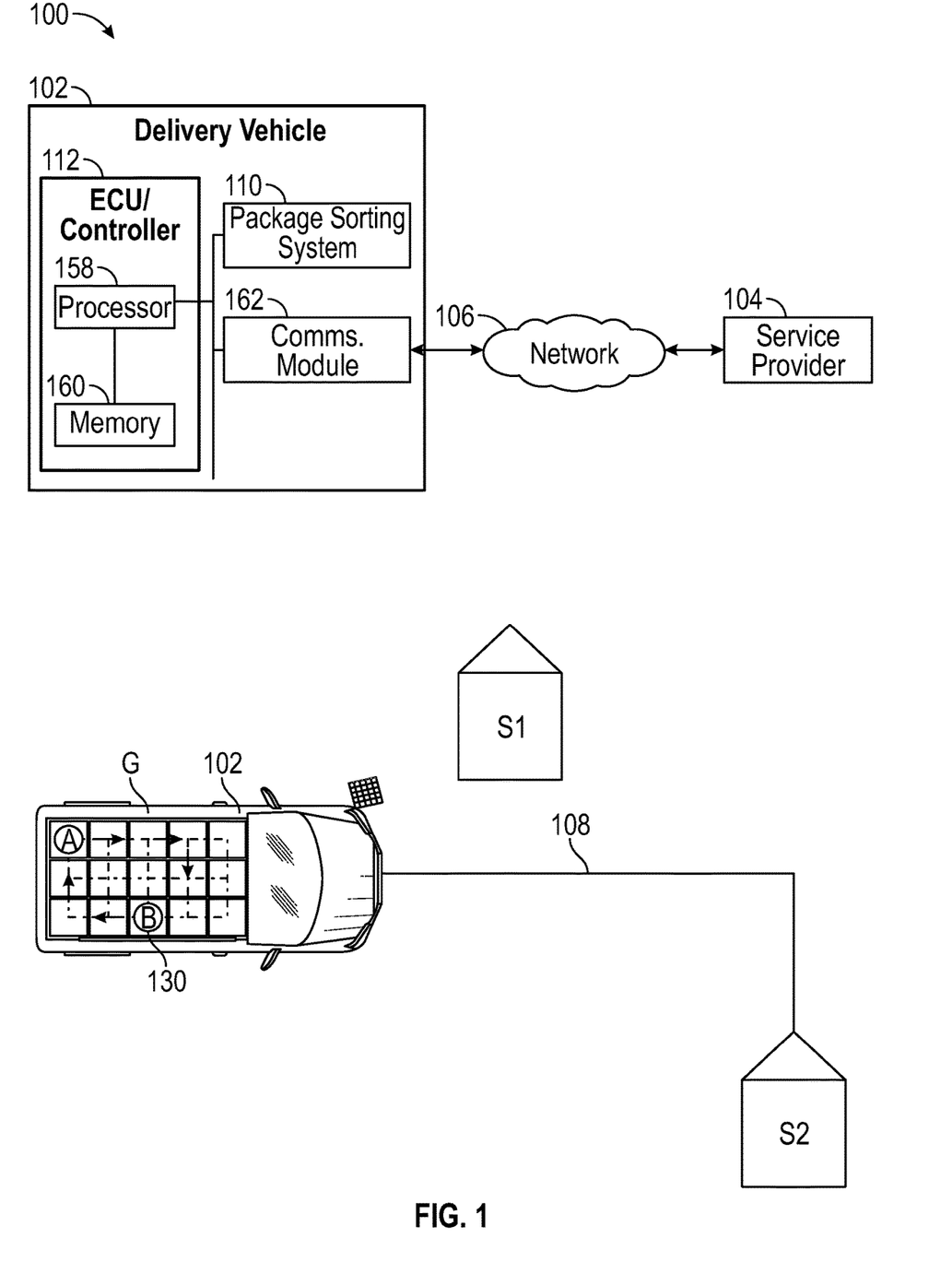
FIG. 1 illustrates an example architecture where the systems and method of the present disclosure may be practiced.

Turning now to the drawings, FIG. 1 depicts an illustrative architecture 100 in which techniques and structures of the present disclosure may be implemented. The architecture 100 includes a delivery vehicle 102, a service provider 104, and a network 106. Some or all of these components in the architecture 100 can communicate with one another using the network 106. The network 106 can include combinations of networks that enable the components in the architecture 100 to communicate with one another. The network 106 may include any one or a combination of multiple different types of networks, such as cellular, cable, the Internet, wireless networks, and other private and/or public networks. In some instances, the network 106 may include Wi-Fi or Wi-Fi direct.

The delivery vehicle 102 may deliver packages along a route 108. For example, the route 108 includes two stops S1 and S2 where packages are to be delivered by the delivery vehicle 102. In some instances, packages can be automatically rearranged as the delivery vehicle 102 migrates from stop to stop along the route 108. The delivery vehicle 102 includes a package sorting system (hereinafter "system 110") and an ECU (hereinafter "controller 112).

Figure 2:
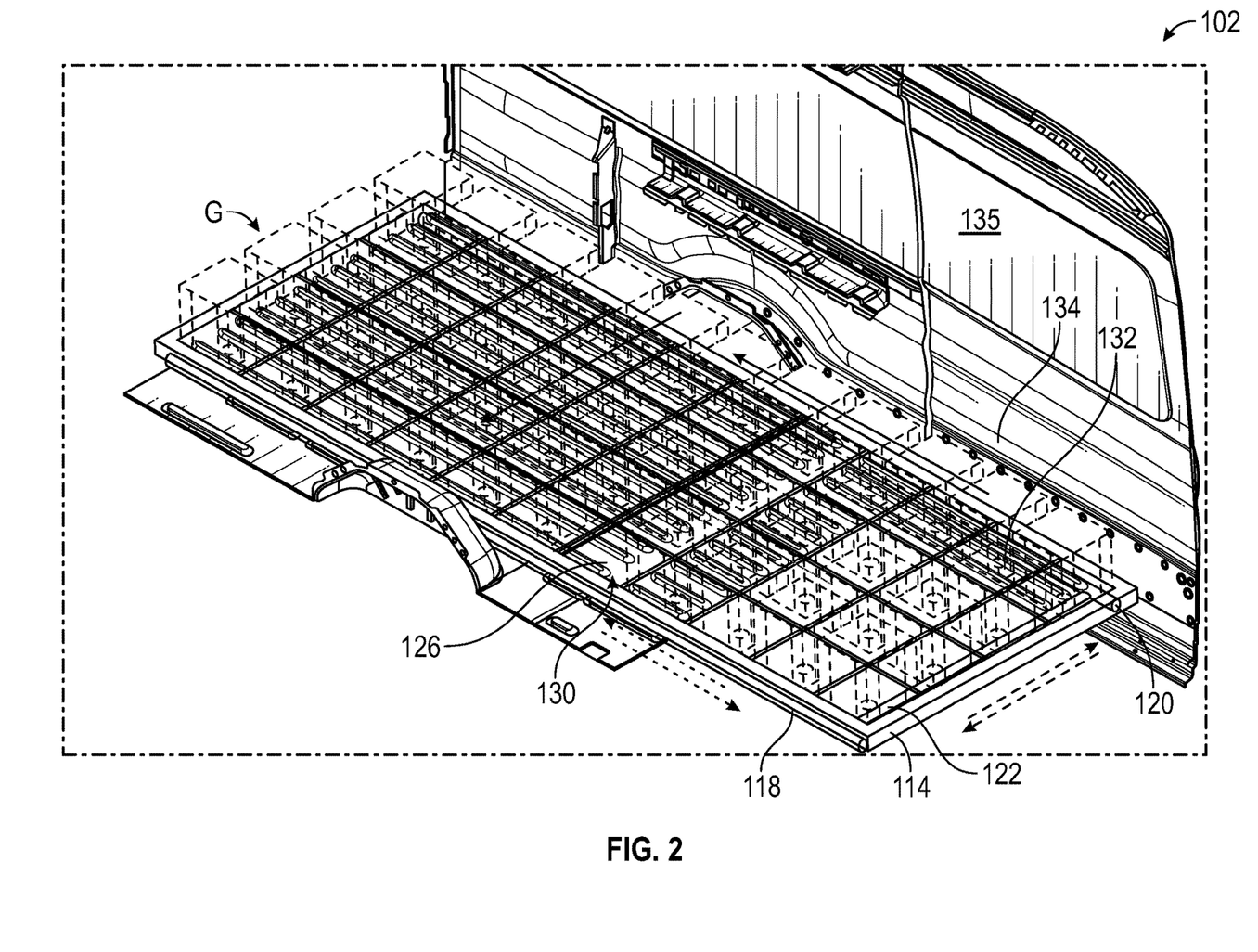
FIG. 2 is a perspective view of an example system of the present disclosure located in a cargo area of a vehicle.
Figure 3:
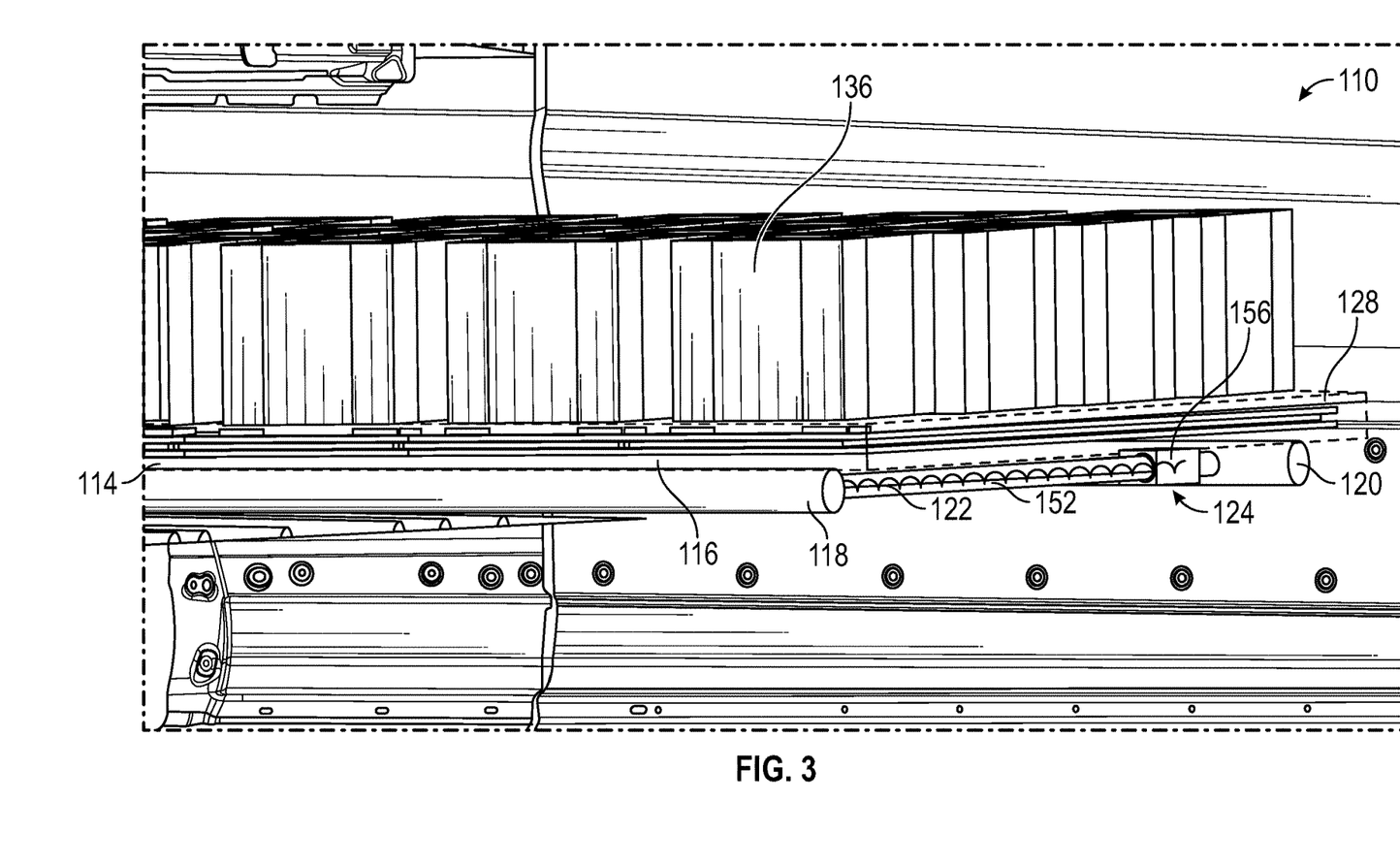
FIG. 3 is another perspective view of the example system, showing a portion of an underside of the system.

Referring now to FIGS. 1-3 collectively, the system 110 can comprise a slab moving assembly comprising a platform 114, a plurality of slabs, such as slab 116, a pair of frame rails (first frame rail 118 and second frame rail 120), a cross-member 122, and a carrier head 124. In general, the system 110 can be located in a cargo area of the delivery vehicle 102.

The platform 114 is a flat member having an upper surface 126 upon which the slabs are allowed to translate. The platform 114 can include an optional peripheral flange 128 that extends upwardly around an outer-peripheral edge of the platform 114. The flange 128 acts as a stop to prevent slabs and/or packages from falling off the platform 114.

The platform 114 can be configured as an array or grid G having a plurality of slots. The number of slots on the platform 114 can vary. In some instances, the plurality of slabs can be placed into the grid G except for one open slot 130. Further, one or more of the slots may be designated as a target slot 132. In general, the target slot(s) may be slots that are located in proximity to a target location such as a side or rear door. For example, the delivery vehicle 102 can have a target location 134 that is associate with the target slot 132. It will be understood that more than one slot may be a target slot. For example, if the rear or side door of the delivery vehicle 102 is large (e.g., spanning more than one slot), any of the slots aligned with the door may be target slots. In this example, the target location 134 is in front of a side door 135.

Figure 4:
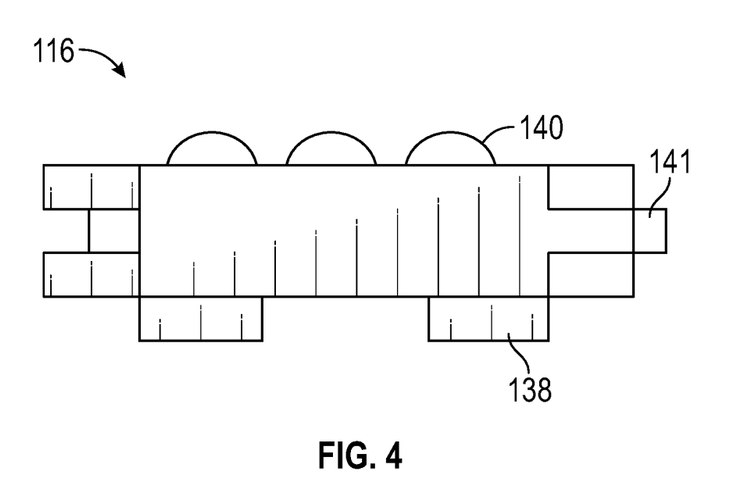
FIG. 4 is yet another close-up, perspective view of the example system, along with an upside-down elevation view of an example slab.

With respect to the slabs, each of the slabs can be configured identically to one another. Thus, for purposes of brevity and clarity, the structural configuration of the slab 116 will be discussed in greater detail. Referring briefly to FIG. 4, the slab 116 can, comprise a flat member that is configured to support a package 136. The slab 116 can be substantially or actually square in its dimensions. The slab 116 can have tabs, such as tab 138 that extends upwardly from the corners of the slab 116 to retain the package 136. Translating members such a rolling member 140 (e.g., ball bearings) can be disposed on the underside of the slab 116. The slab 116 can include any number and/or size of rolling balls that may vary according to design requirements. Also, while rolling balls have been described, other equivalent translating members can be used in accordance with the present disclosure. In other embodiments, the translating members are not used, but methods for reducing friction between the upper surface 126 of the platform and the slabs can be used, such as reduced-friction coatings and/or compressed air.

Referring back to FIGS. 1-3, the slab 116 can include edges with a tongue and/or groove that allow adjacent slabs to engage with one another, while allowing for lateral translation relative to one another. For example, the slab 116 includes a tongue 141 that engages with groove 142 of an adjacent slab 144. The slab 116 can include a groove 146 that engages with a tongue of another adjacent slab 150.

As noted above, the slab moving assembly can comprise a first frame rail 118 and second frame rail 120 are disposed on an underside of the platform 114 and flank opposing sides of the platform 114. The slab moving assembly can also include a cross-member 122 that spans between the first frame rail 118 and second frame rail 120. The cross-member 122 translates perpendicularly to the first frame rail 118 and second frame rail 120. The cross-member 122 can be moved along the first frame rail 118 and second frame rail 120 using any desired mechanism(s) such as a chain or belt (not shown). The slab moving assembly can also comprise the carrier head 124. The carrier head 124 can couple to the cross-member 122 and can be configured to translate along the cross-member using a chain or belt 152. The carrier head 124 can translate back, and forth along the cross-member 122 in a direction of travel that is perpendicular to the direction of travel of the cross-member 122. In this way, cooperative movement of both the cross-member 122 and the slab moving assembly can place the carrier head 124 underneath any of the slabs.

The carrier head 124 comprises a slab interface 156 for selectively coupling with a selected slab. For example the slab interface 156 can include a mechanical coupling such as a rod, clamp, detent, hook, or another similar mechanism that provides a releasable mechanical coupling between the carrier head 124 and the slab. A magnetic coupling or the like may also be used. Thus, when the slab interface 156 is engaged with the slab, movement of the carrier head 124 moves the slab. When the slab is placed, the slab interface 156 can be retracted or otherwise disengaged from the slab. In another example, the slab interface 156 can include a magnetic member that magnetically engages with a portion of the slab when the carrier head 124 is moving the slab. The use of a mechanical and/or magnetic coupling is provided for example purposes only, and other mechanisms can be used. Thus, in general, the carrier head 124 can be used to couple or engage with a slab in order to move the slab from one slot to another slot. An example slab moving method is disclosed with respect to FIG. 2, which is disclosed in greater detail infra.

The controller 112 comprises a processor 158 and memory 160. The processor 158 executes instructions stored, in memory 160 to provide any of the functions disclosed herein. When referring to functions performed by the controller 112, it will be understood that this includes the execution of instructions stored in memory 160 by the processor 158. The controller 112 can access the network 108 using a communications module 162.

As noted above, each of the slabs may support a package that is to be delivered to an address. Each slab of the platform can be identified using a slab identifier. Further, the package associated with a slab can be associated with a delivery address. The package can be linked to the slab onto which it is placed. In some instances, this linking process can be done by a user when loading packages onto the slabs prior to delivery. To be sure, this process can be automated at a logistics facility as well.

The controller 112 can determine where a selected package is located on the platform by the linked data. For example, the controller 112 can identify that a package that is to be delivered to the stop S2 is associated with one of the slabs of the platform. When the desired package has been identified and its corresponding slab identified, the controller 112 can then determine a repositioning schema for rearranging the plurality of slabs so that the selected slab is located proximate to a target location 134 of the delivery vehicle 102. This includes placing the selected slab at the target slot 132 that is proximate the target location 134.

The repositioning schema includes a sequenced movement of the slabs that, when performed; will result in the selected slab/package being positioned in front of the door of the delivery vehicle 102. It will be understood that this sequenced movement of the slabs is made possible because one of the slots of the grid G of the platform 114 is left open. Once the repositioning schema is determined, the controller 112 can cause the slab moving assembly to reposition the plurality of slabs in accordance with the reposition schema to place the selected slab at the target slot/target location in front of the target location 134.

In some instances, the controller 112 can determine a list of slab-moving commands, referred to as a repositioning schema, that determines when slabs need to move and their respective translation directions, step-by-step. The controller 112 utilizes the repositioning schema to cause the slab moving assembly to rearranged the slabs so as to place the desired package near the target location. For example, the controller 112 transmits commands to mechanisms that cause the cross-member 122 to translate along the first frame rail 118 and second frame rail 120, as well as the carrier head 124 to translate along the cross-member 122. The controller 112 can also issue commands to the carrier head 124 to align with a particular slab. The slab interface 156 can be controlled to engage and/or disengage with a slab being moved.

Figure 5:
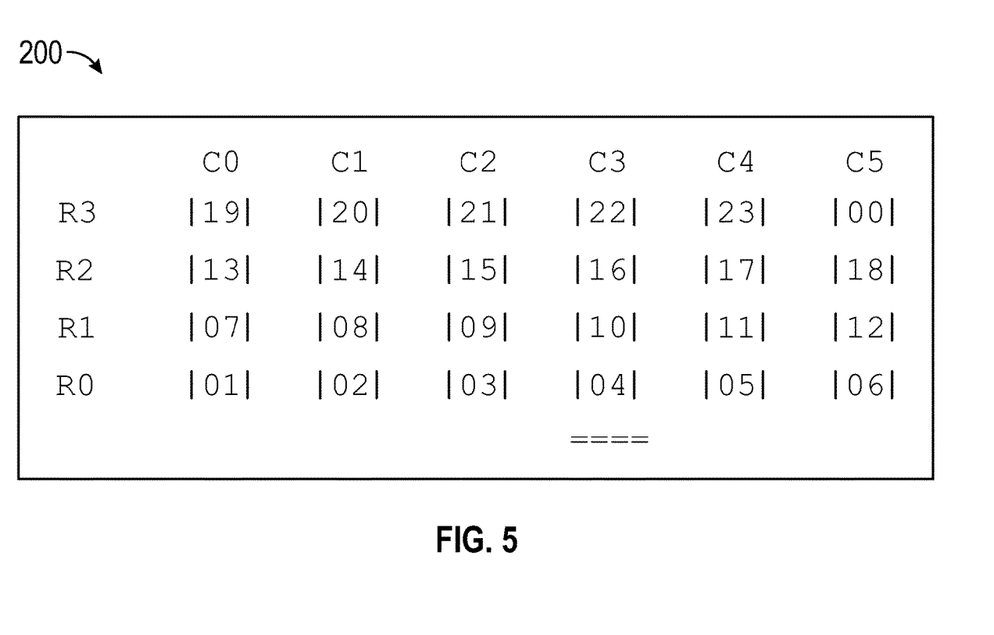
FIG. 5 is a schematic view of an example platform and grid.

FIG. 5 is a schematic or tabular view of a platform having slabs arranged into slots of a grid. The grid has rows and columns, allowing the slots to be uniquely identified. Also, each of the slabs can be uniquely identified. Thus, as slabs are moved around on the grid, their location can be identified by the slot in which they occupy.

In general, a controller can model the grid G as an array of rows and columns with assigned coordinates R(i), C(j). Each position has a slab identified by a unique identification number. In more detail, grid G of a platform 200 can be arranged into six columns C0-C5, along with four rows R0-R3. Slots are arranged in numerical order from 00 to 23. In this example, slot 00 is the open slot (coordinates R3-C5). Slot 04 is the target slot (coordinates R0-C3) which is associated with a target location, such as a door of the delivery vehicle.

As noted above, only one of the coordinates is the empty position/open slot, which can be identified as slot 00 or another similar identifier. Any slab adjacent to slot 00 can move onto the open slot coordinates by moving right, left, up, or down. The controller receives as input an identification number associated with the package that needs to move to the target location/slot.

Figure 6:
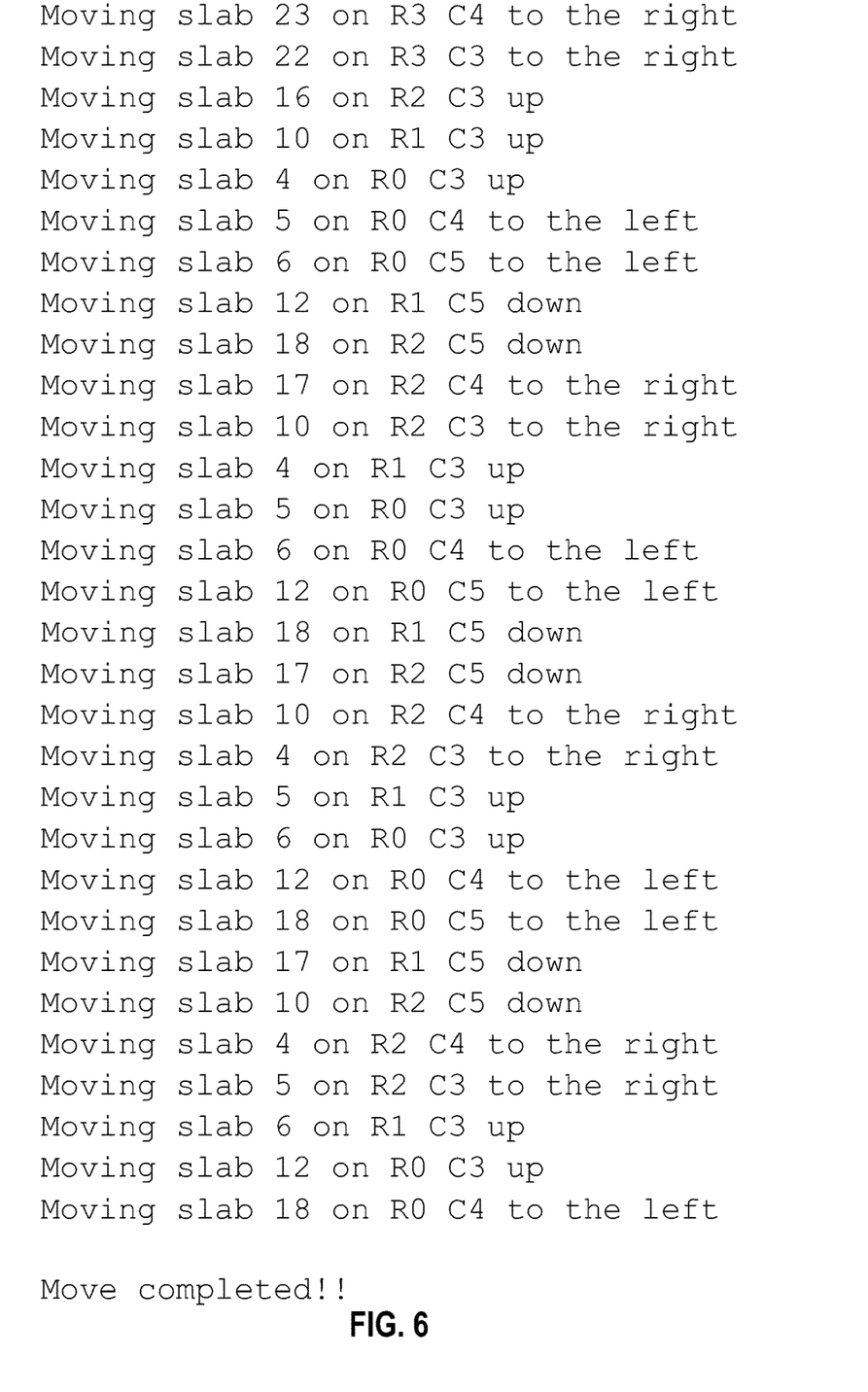
FIG. 6 is an example slab repositioning schema for use with the example platform and grid of FIG. 5.

FIG. 6 is a table corresponding to a repositioning schema. FIGS. 5 and 6 will be referenced collectively in an example use case. The repositioning schema of FIG. 6 moves the slab in slot 18 to slot 04 (location R0, C3).

Referring back to FIGS. 1-3, in some instances, the controller 112 can be configured to determine the repositioning schema and execute the repositioning schema upon determining a next delivery address. For example, after the package assigned for delivery at stop S1 is complete, the controller 112 can determine a next delivery address, which would be the address associated with stop S2. To be sure, the controller 112 can determine the order of stops based on an assigned delivery route provided by the service provider 104. For example, the service provider 104 can determine an optimal logistics plan and route for the delivery vehicle 102. The delivery vehicle can receive the route from the service provider 104 over the network 106. In other instances, the next delivery address can be transmitted, by the service provider 104 to the controller 112 on an ad-hoc basis. Regardless of how the next delivery address is acquired, the controller 112 can automatically rearrange the slot/slab associated with the next delivery address to be in front of the door of the delivery vehicle as the vehicle travels from stop S1 to stop S2.

Figure 7:
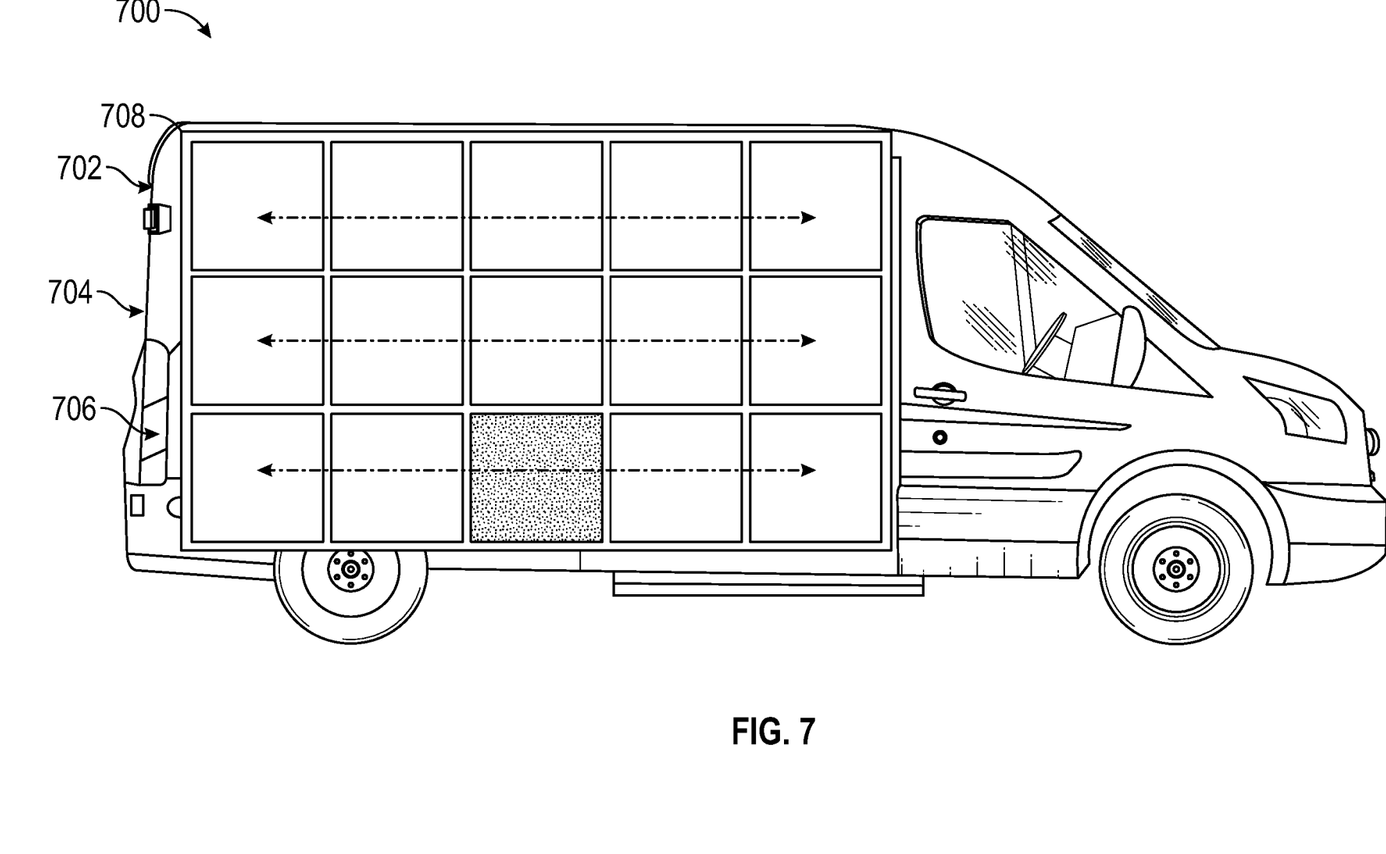
FIG. 7 illustrates an example vehicle with a plurality of stacked systems used to rearrange packages for delivery.

FIG. 7 is a side elevation view of an example vehicle 700 having a plurality of package sorting systems, namely systems 702, 704, and 706, located, in a cargo area 708 of the vehicle 700. The systems 702, 704, and 706 are each configured similarly to the system 110 of FIG. 1. In these examples, the target location includes a larger-format door that allows an operator of the vehicle to have access to each of the systems 702, 704, and 706. In some instances, the operator can be instructed as to which of the systems 702, 704, and 706 hold the package being delivered. This can be accomplished by displaying such information on a human-machine interface of the vehicle and/or a mobile device used by the operator.

Figure 8:
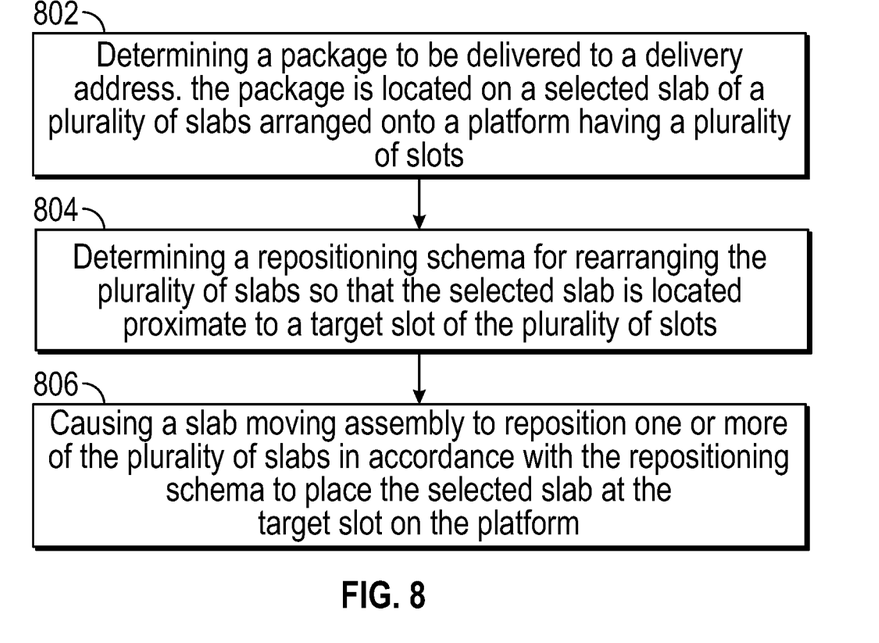
FIG. 8 is a flowchart of an example method of the present disclosure.

FIG. 8 is a flowchart of an example method of the present disclosure. The method includes a step 802 of determining a package to be delivered to a delivery address. As noted above, the package is located on a selected slab of a plurality of slabs arranged onto a platform having a plurality of slots. The method can also include a step 804 of determining a repositioning schema for rearranging the plurality of slabs so that the selected slab is located proximate to a target slot of the plurality of slots. For example, when used, the repositioning schema allows for selectively repositioning of a portion (e.g., one or more) of the slabs. The repositioning includes moving one slab into an open slot of the platform. This causes the open slot to move around to a new slot of the platform. Successive repositioning of slabs using the open slot results in the selected slab migrating to a position in front of the door of the delivery vehicle.

Thus, the method includes a step 806 of causing a slab moving assembly to reposition one or more of the plurality of slabs in accordance with the repositioning schema to place the selected slab at the target slot on the platform. Step 806 can involve a step of activating a carrier head of the slab moving assembly to engage with the one or more of the plurality of slabs, as well as a step of causing the carrier head to translate along a cross-member. The method can also include causing the cross-member to translate along a pair of frame rails disposed on opposing sides of the platform.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems, and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described, features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and, scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:
1. A system, comprising:
 a platform of a vehicle, the platform being arranged as a grid having a plurality of slots comprising at least an open slot and a target slot, wherein the target slot is located proximate to a target location of the vehicle, the target location comprising an external access point of the vehicle;

a plurality of slabs placed into the grid except for in the open slot, wherein each slab of the plurality of slabs comprises a substantially flat base having a base surface oriented parallel to the platform and configured to receive a package directly atop the base surface;

a slab moving assembly comprising:
  a pair of frame rails laterally disposed on opposing sides of the platform;
  a cross-member extending perpendicularly between the pair of frame rails, the cross-member being configured to translate along the pair of frame rails; and
  a carrier head coupled to the cross-member, the carrier head capable of translating along the cross-member, the carrier head having a slab interface for selectively coupling with a selected slab of the plurality of slabs; and a controller comprising a processor and memory, the processor executing instructions stored in the memory to:
  determine the selected slab to move to the target slot on the platform;
  determine a repositioning schema for rearranging at least a portion of the plurality of slabs so that the selected slab is located proximate to the target slot of the plurality of slots; and
  cause the slab moving assembly to reposition one or more of the plurality of slabs in accordance with the repositioning schema to place the selected slab proximate to the target slot on the platform.

2. The system according to claim 1, wherein the system is disposed within a cargo area of the vehicle, the cargo area comprising at least one of a side door or a rear door.

3. The system according to claim 2, wherein the target slot is located proximate to the side door or the rear door.

4. The system according to claim 1, wherein the slab interface magnetically engages with the selected slab.

5. The system according to claim 1, wherein the slab interface mechanically engages with the selected slab.

6. The system according to claim 1, wherein each slab of the plurality of slabs further comprises one or more rolling members that allow for translation across an upper surface of the platform.

7. The system according to claim 1, wherein the package which the substantially flat base of each slab is configured to receive is associated with a delivery address.

8. The system according to claim 7, wherein the processor executes the instructions to determine a next delivery address that comprises the delivery address, wherein the repositioning of the one or more of the plurality of slabs occurs as the vehicle drives to the next delivery address.

9. The system according to claim 1, wherein each slab of the plurality of slabs further comprises one or more retention elements configured to restrict movement of the package to the base surface, the one or more retention elements comprising one or more ribs or flanges.

10. A system, comprising:
  a platform of a vehicle having a plurality of slabs placed into a grid configuration, each slab of the plurality of slabs being configured to translate along an upper surface of the platform and comprising a substantially flat base having a base surface oriented parallel to the platform and configured to receive a package directly atop the base surface;
  a slab moving assembly comprising:
    a pair of frame rails laterally disposed on opposing sides of the platform;
    a cross-member extending perpendicularly between the pair of frame rails, the cross-member being configured to translate along the pair of frame rails; and
    a carrier head coupled to the cross-member, the carrier head capable of translating along the cross-member, the carrier head having a slab interface for selectively coupling with a selected slab; and
  a controller comprising a processor and memory, the processor executing instructions stored in the memory to:
    determine a repositioning schema for rearranging the plurality of slabs so that the selected slab is located proximate to a target slot of a plurality of slots, wherein the target slot is located proximate to a target location of the vehicle, the target location comprising an external access point of the vehicle; and
    cause the slab moving assembly to reposition the plurality of slabs in accordance with the repositioning schema to place the selected slab at the target slot on the platform.

11. The system according to claim 10, wherein each slab of the plurality of slabs is configured to translate in each of two linear directions.

12. The system according to claim 10, wherein the system is disposed within a cargo area of the vehicle, the cargo area having at least one of a side door or a rear door.

13. The system according to claim 12, wherein the target slot is located proximate to the side door or the rear door.

14. A method comprising:
  determining a package to be delivered to a delivery address, the package being located on a selected slab of a plurality of slabs arranged onto a platform of a vehicle in a plurality of slots, wherein each slab of the plurality of slabs comprises a substantially flat base having a base surface oriented parallel to the platform and configured to receive the package directly atop the base surface;
  determining a repositioning schema for rearranging the plurality of slabs so that the selected slab is located proximate to a target slot of the plurality of slots, wherein the target slot is located proximate to a target location of the vehicle, the target location comprising an external access point of the vehicle; and
  causing a slab moving assembly to reposition one or more of the plurality of slabs in accordance with the repositioning schema to place the selected slab at the target slot on the platform;
  activating a carrier head of the slab moving assembly to engage with the one or more of the plurality of slabs;
  causing the carrier head to translate along a cross-member; and
  causing the cross-member to translate along a pair of frame rails laterally disposed on opposing sides of the platform.

15. The method according to claim 14, wherein the repositioning of the one or more of the plurality of slabs occurs as the vehicle drives to a next delivery address that comprises the delivery address of the package.

* * * * *